US012080843B2

(12) United States Patent
Yoo et al.

(10) Patent No.: US 12,080,843 B2
(45) Date of Patent: Sep. 3, 2024

(54) BATTERY CELL WITH MULTIPLE SEPARATOR LAYERS THAT INCLUDE ADHESIVE AND CERAMIC MATERIAL

(71) Applicant: Apple Inc., Cupertino, CA (US)

(72) Inventors: Mikyong Yoo, Palo Alto, CA (US); Richard M. Mank, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 148 days.

(21) Appl. No.: 15/907,762

(22) Filed: Feb. 28, 2018

(65) Prior Publication Data
US 2019/0148692 A1 May 16, 2019

Related U.S. Application Data

(60) Provisional application No. 62/587,300, filed on Nov. 16, 2017.

(51) Int. Cl.
| | | |
|---|---|---|
| *H01M 10/0525* | (2010.01) | |
| *H01M 4/04* | (2006.01) | |
| *H01M 50/403* | (2021.01) | |
| *H01M 50/414* | (2021.01) | |
| *H01M 50/434* | (2021.01) | |

(Continued)

(52) U.S. Cl.
CPC ..... *H01M 10/0525* (2013.01); *H01M 4/0404* (2013.01); *H01M 50/403* (2021.01); *H01M 50/414* (2021.01); *H01M 50/434* (2021.01); *H01M 50/449* (2021.01); *H01M 50/461* (2021.01)

(58) Field of Classification Search
CPC ........... H01M 2/14; H01M 2/16–1686; H01M 50/141; H01M 50/403; H01M 50/461; H01M 50/449; H01M 50/434; H01M 10/0525; H01M 4/0404
USPC ........................................ 429/144, 251, 252
See application file for complete search history.

(56) References Cited

U.S. PATENT DOCUMENTS

| | | |
|---|---|---|
| 5,922,492 A | 7/1999 | Takita et al. |
| 6,148,503 A | 11/2000 | Delnick et al. |

(Continued)

FOREIGN PATENT DOCUMENTS

| | | |
|---|---|---|
| CN | 102244220 A | 11/2011 |
| CN | 102884665 | 1/2013 |

(Continued)

OTHER PUBLICATIONS

EPO Machine Translation of JP 2011243351A, originally published to Katayama et al. on Dec. 1, 2011. (Year: 2011).*

(Continued)

*Primary Examiner* — Sean P Cullen
(74) *Attorney, Agent, or Firm* — Kilpatrick Townsend & Stockton LLP

(57) ABSTRACT

Energy storage devices, battery cells, and batteries may include a battery cell component produced by methods including depositing a first separator layer over an electrode material, where the first separator layer includes a ceramic material. The methods may include depositing a second separator layer over the first separator layer, where the second separator layer includes an adhesive material. The methods may also include drying the second separator layer to form the battery cell component.

20 Claims, 4 Drawing Sheets

(51) Int. Cl.
*H01M 50/449* (2021.01)
*H01M 50/46* (2021.01)

(56) References Cited

U.S. PATENT DOCUMENTS

| | | | |
|---|---|---|---|
| 2007/0122715 A1* | 5/2007 | Fujino | H01M 10/052 429/251 |
| 2008/0241674 A1 | 10/2008 | Kim | |
| 2008/0299461 A1* | 12/2008 | Kim | H01M 10/02 429/245 |
| 2010/0216000 A1* | 8/2010 | Fujita | H01M 4/13 156/60 |
| 2010/0221607 A1* | 9/2010 | Hatanaka | H01M 4/62 429/209 |
| 2011/0045168 A1* | 2/2011 | Seo | H01M 2/1646 427/58 |
| 2011/0135987 A1* | 6/2011 | Shin | H01M 10/052 429/231.1 |
| 2011/0217585 A1* | 9/2011 | Wang | H01M 50/414 118/620 |
| 2012/0021264 A1* | 1/2012 | Morishima | H01M 10/0587 29/623.5 |
| 2012/0225345 A1* | 9/2012 | Kim | H01M 10/052 429/145 |
| 2012/0308887 A1 | 12/2012 | Hucker et al. | |
| 2013/0216867 A1 | 8/2013 | Schaefer et al. | |
| 2013/0260207 A1 | 10/2013 | Uemura | |
| 2013/0309566 A1* | 11/2013 | Umehara | H01M 4/0404 429/211 |
| 2014/0045056 A1* | 2/2014 | Yamami | H01M 10/0567 429/188 |
| 2014/0162139 A1 | 6/2014 | Hoshiba et al. | |
| 2014/0248525 A1 | 9/2014 | Iwai et al. | |
| 2015/0147624 A1* | 5/2015 | Yamafuku | H01M 2/204 429/121 |
| 2015/0243952 A1 | 8/2015 | Ka et al. | |
| 2015/0357619 A1 | 12/2015 | Bae et al. | |
| 2016/0043370 A1 | 2/2016 | Hatta et al. | |
| 2016/0149184 A1* | 5/2016 | Nam | H01M 2/1646 429/144 |
| 2017/0033350 A1 | 2/2017 | Mizuno et al. | |
| 2017/0263907 A1 | 9/2017 | Ameyama et al. | |
| 2017/0317375 A1* | 11/2017 | Cho | H01M 10/0459 |
| 2018/0309108 A1* | 10/2018 | Shin | H01M 2/1653 |

FOREIGN PATENT DOCUMENTS

| | | | | |
|---|---|---|---|---|
| CN | 105849942 | A | | 8/2016 |
| CN | 106410266 | | | 2/2017 |
| CN | 106410266 | A | * | 2/2017 |
| CN | 107342391 | | | 11/2017 |
| JP | 2005235695 | A | * | 9/2005 |
| JP | 2011243351 | A | * | 12/2011 |
| JP | 5579497 | B2 | | 8/2014 |
| KR | 20080088194 | A | | 10/2008 |
| KR | 20160118966 | A | | 10/2016 |
| KR | 20170012962 | A | | 2/2017 |
| KR | 20170014223 | A | | 2/2017 |
| WO | 2005124918 | A2 | | 12/2005 |
| WO | WO-2017171524 | A1 | * | 10/2017 ............. H01M 2/16 |

OTHER PUBLICATIONS

National Center for Biotechnology Information. "PubChem Compound Summary for CID 9989226, Aluminum oxide" PubChem, https://pubchem.ncbi.nlm.nih.gov/compound/Aluminum-oxide. Accessed May 18, 2021. (Year: 2021).*

*Along, adj., prep. & adv. Meanings, Etymology & More*, Oxford English Dictionary, https://www.oed.com/dictionary/along_adj2?tab=meaning_and_use#6379000 (Aug. 1, 2023).*

*Dispose, v. Meanings, Etymology & More*, Oxford English Dictionary, https://www.oed.com/dictionary/dispose_v?tab=meaning_and_use#6438237 (Aug. 1, 2023).*

*Separator, n. Meanings, Etymology and More*, Oxford English Dictionary, https://www.oed.com/dictionary/separator_n?tab=meaning_and_use#23626031 (Jul. 26, 2023).*

"Notice of Preliminary Rejection," mailed May 1, 2020 in Korean Application No. 10-2018-0139949. 17 pages. (Includes English translation).

Chinese Patent Application No. 201811361537.5 , Office Action, Mailed On Apr. 23, 2021, 17 pages.

Application No. CN201811361537.5 , Notice of Decision to Grant, Mailed On Mar. 3, 2022, 15 pages. English translation begins on p. 8.

"Non-Final Office Action," mailed Mar. 7, 2023 in U.S. Appl. No. 16/031,316, 18 pages.

"Non-Final Office Action," mailed Dec. 21, 2021 in U.S. Appl. No. 16/031,316, 18 pages.

"Final Office Action," mailed Oct. 17, 2022 in U.S. Appl. No. 16/031,317. 17 pages.

* cited by examiner

BATTERY CELL WITH MULTIPLE SEPARATOR LAYERS THAT INCLUDE ADHESIVE AND CERAMIC MATERIAL

CROSS-REFERENCE TO RELATED APPLICATIONS

This application claims priority to U.S. Provisional Application No. 62/587,300, filed Nov. 16, 2017, the disclosure of which is hereby incorporated by reference in its entirety for all purposes.

TECHNICAL FIELD

The present technology relates to batteries and battery components. More specifically, the present technology relates to improved battery separator designs and configurations for energy storage devices.

BACKGROUND

In rechargeable battery designs, the separator allows ionic transmission for charging and discharging, while preventing electrical contact between the electrode materials. As battery designs utilize different materials, and continue to increase in volumetric density, the separator may be stressed further during cycling.

SUMMARY

Energy storage devices, battery cells, and batteries may include a battery cell component produced by methods including depositing a first separator layer over an electrode material, where the first separator layer includes a ceramic material. The methods may include depositing a second separator layer over the first separator layer, where the second separator layer includes an adhesive material. The methods may also include drying the second separator layer to form the battery cell component.

In some embodiments the methods may include a wet-on-wet formation of the second separator layer over the first separator layer. The first separator layer may include a porogen. The methods may also include drying the first separator layer prior to depositing the second separator layer. The methods may also include exposing the first separator layer to an energy source to dissolve at least a portion of the porogen. The energy source may be an ultraviolet source, an e-beam source, or heat. The electrode material may be formed over a current collector. At least one of the first separator layer or the second separator layer may extend beyond a lateral edge of the electrode material to contact the current collector. The methods may include dicing the battery cell component. The dicing may form a tab region of the current collector, and the tab region may be partially coated on one or more surfaces with at least one of the first separator layer or the second separator layer. The ceramic material may be or include a compound including an element selected from the group including aluminum, boron, magnesium, silicon, titanium, yttrium, or zirconium. The adhesive material may be or include an acrylate or polyvinylidene fluoride ("PVDF"). The electrode material may be an anode electrode material.

The present technology also encompasses additional methods for producing a battery cell component. The methods may include applying an electrode material on a current collector. The electrode material may be applied discontinuously to maintain lateral gaps across the current collector where a surface of the current collector remains exposed within the lateral gaps. The methods may also include applying a separator material overlying the electrode material. The separator material may extend within the lateral gaps across the current collector. The separator material may be applied discontinuously to maintain a portion of the surface of the current collector exposed within the lateral gaps across the current collector.

In some embodiments the methods may also include dicing the current collector to form a battery cell electrode. The battery cell electrode as diced may include an electrode tab having a section of the current collector exposed within the lateral gaps across the current collector. Applying the separator material may include depositing a first separator layer including a ceramic material over the electrode material. Applying the separator material may also include depositing a second separator layer including an adhesive material over the first separator layer. The first separator layer may include a porogen, and the methods may also include exposing the first separator layer to an energy source to at least partially dissolve the porogen.

Embodiments of the present technology also encompass battery cells. The battery cells may include a first current collector. A cathode active material may be disposed along the first current collector. The battery cells may also include a second current collector. An anode active material may be disposed along the second current collector. The battery cells may also include a separator disposed between the cathode active material and the anode active material. In some embodiments the separator may include a first separator layer adjacent the anode active material. The first separator layer may include a ceramic material. The separator may also include a second separator layer adjacent the cathode active material. The second separator layer may include an adhesive material.

In some embodiments the first separator layer may be characterized by a thickness less than about 20 μm. The ceramic material may include a compound including an element selected from the group including aluminum, boron, magnesium, silicon, titanium, yttrium, or zirconium. The first separator layer may include a microencapsulated material disposed throughout the first separator layer. The microencapsulated material may include a first material encapsulated within a second material, and the second material may be characterized by a breakdown temperature above about 100° C. When the second material is exposed to the breakdown temperature for a sufficient period of time, the first material may flow within the first separator layer and fill pores of the first separator layer causing shutdown of the battery cell.

The present technology may provide numerous benefits over conventional technology. For example, the present separators may have improved mechanical integrity at reduced profile thicknesses over conventional designs. Additionally, the separators may be characterized by reduced stress in corners of a produced battery cell, and the separators may provide protection against cut burrs. These and other embodiments, along with many of their advantages and features, are described in more detail in conjunction with the below description and accompanying figures.

BRIEF DESCRIPTION OF THE DRAWINGS

A further understanding of the nature and advantages of the disclosed embodiments may be realized by reference to the remaining portions of the specification and the drawings.

Figure 1:
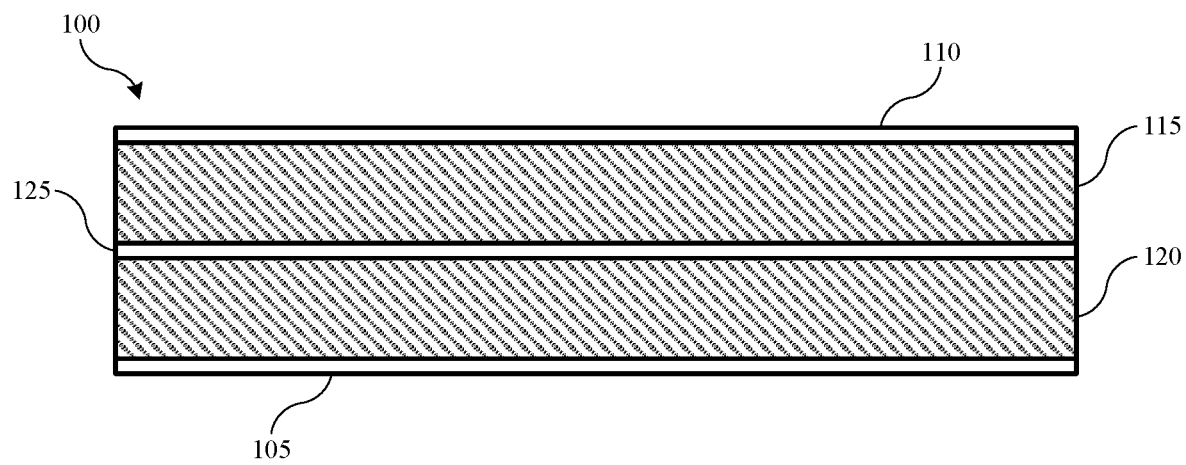
FIG. 1 shows a schematic view of layers of an energy storage device according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Battery separators provide a variety of functions within a battery cell. In addition to supporting ionic transport between a cathode and anode, the material limits electrical contact of the two components to prevent electrical shorting between cathode and anode materials. Battery separators may be formulated by balancing a number of characteristics of the component. For example, battery separators may include materials selected based on compatibility with electrode materials or electrolyte materials, electrochemical stability, thermal stability, flexibility, and other factors. Battery separators can include combinations of components as well. For example, woven polymeric separators are sometimes utilized in battery designs because of the porosity provided. An issue with woven polymeric separators, however, is that they may be less thermally stable, and may shrink during operation or during abuse conditions, which may lead to shorting. More thermally stable designs may include non-woven polymers and/or ceramic separators. However, these designs may lose mechanical flexibility and have reduced permeability, and may require increased thicknesses due to manufacturing limitations. For example, ceramic separators having a thickness less than a few dozen micrometers may exhibit a brittle structure reducing handling capability. Ceramic separators may also lack a shutdown capability allowing the separator to limit or reduce ionic transfer between electrodes during abuse conditions.

Conventional technologies have been limited to utilizing ceramic separators with technologies that allow for increased thickness. For example, many conventional mobile devices may not include ceramic separators due to constraints on the thickness of a separator, which may be half the thickness needed for ceramic stand-alone separators. As many electrode assembly operations utilize roll-to-roll or winding processes, ceramic separators may be incapable of winding unless maintained above a few dozen micrometers in thickness. Additionally, the dense ceramic structure may be characterized by reduced air permeability and lower ionic transport rates, which may affect operation of the produced batteries. Ceramic separators may also be characterized by limited adhesion with the electrode active material. Without sufficient adhesion, the active material may swell during operation or produce dendrites affecting cycle life of the produced battery.

The present technology may overcome these issues by forming separators including multiple layers including a first layer having a ceramic material, and a second layer including an adhesive. The layers may be formed directly over additional cell materials, which may act as a support for the ceramic material. This may produce battery cell components that may be wound, while being characterized by reduced thicknesses over conventional materials. Separators according to some embodiments of the present technology may also include additional features including porogens or microencapsulated materials providing additional improvements over conventional materials. Accordingly, the present technology provides separators characterized by improved thermal stability and other operational characteristics compared to conventional designs.

Although the remaining portions of the description will routinely reference lithium-ion batteries, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

FIG. 1 shows a cross-sectional view of an exemplary energy storage device 100 according to some embodiments of the present technology. Energy storage device 100 may be a battery, a battery cell, or some other energy storage device in embodiments. Exemplary energy storage device 100 includes a first current collector 105 and a second current collector 110, one of which may be the anode, and the other the cathode side of the energy storage device. Current collectors 105 and 110 may be made of any known collector materials, such as aluminum, copper, nickel, stainless steel, or a variety of other materials that may be capable of operating at cathode and anode potentials within the cell environment.

Energy storage device 100 includes electrode active material 115 disposed on current collector 110, and electrode active material 120 disposed on current collector 105. Again, either of electrode active materials 115, 120 may be the anode or cathode materials in exemplary designs. In some examples, electrode active material 115 is an anode material and includes a carbon-containing compound such as graphite or a lithium-containing compound such as lithium titanate. Any other anode materials may similarly be used with the present technology. Additionally, for example, electrode active material 120 is a cathode material including a lithium-containing material such as lithium cobalt oxide or lithium phosphate, among other known lithium compounds used in such devices. The electrode active material 120 may also include nickel, manganese, cobalt, aluminum, and a variety of other materials that would be understood to be encompassed by the present technology. Indeed, any possible anode and cathode materials that may be utilized in batteries including separators as will be described below are suitable for the present designs, and will be understood to be encompassed by the present technology. Separator 125 is disposed between the electrode active materials 115, 120, and may include a variety of materials that allows lithium ions to pass through the separator structure while not otherwise conducting electricity.

Figure 2:
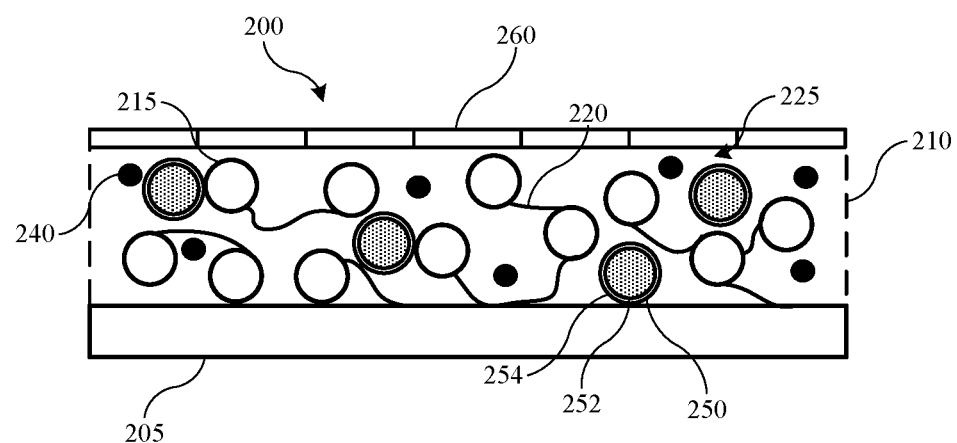
FIG. 2 shows a schematic view of an exemplary separator according to some embodiments of the present technology.

FIG. 2 shows a schematic view of an exemplary separator 200 according to embodiments of the present technology. Separator 200 may be included in a battery cell, such as battery cell 100 previously described. The separator may be positioned between active materials for an anode and a cathode in embodiments, and may be formed directly over an electrode active material 205. Exemplary separator 200 is characterized by a first separator layer 210, and a second separator layer 260.

First separator layer 210 includes one or more materials including a ceramic material in some embodiments. Incorporating a ceramic material into the separator structure may afford dimensional stability as well as reduced thermal shrinkage. When incorporated as a particulate material, ceramics may include a platelet structure, which may increase tortuosity through the separator structure, or reduce porosity. Both pore size and pore structure relate to the ease with which ions, such as lithium ions, for example, may pass through the separator structure. The more tortuous the path through the structure, the more cycling rate capability may be reduced. Accordingly, first separator layer 210 is not completely composed of ceramic materials in some embodiments, or may include additional materials that allow porosity to be adjusted within the first separator layer 210.

In some embodiments, a binder is included in the first separator layer with the ceramic materials, which provides a structure that maintains particular ion throughput characteristics for the separator. As illustrated within an unspecified spacing 225, binder material 220 may form polymer chains among ceramic particles 215. The ceramic particles 215 and the binder 220 are the materials composing the first separator layer in some embodiments, while in some embodiments additional materials may also be included in the first separator layer 210. When the ceramic particles and binder substantially make up the first separator layer, the ceramic particles may be included at greater than or about 40 wt. % of the first separator layer, and in embodiments the ceramic particles may be included at greater than or about 50 wt. %, greater than or about 60 wt. %, greater than or about 70 wt. %, greater than or about 80 wt. %, greater than or about 90 wt. %, greater than or about 95 wt. %, or more of the first separator layer, with the balance being the binder material and/or additional components of the first separator layer when included.

For example, in embodiments the binder is included at less than or about 60 wt. % of the first separator layer. In some embodiments, the binder may be included at less than or about 50 wt. %, less than or about 40 wt. %, less than or about 30 wt. %, less than or about 20 wt. %, less than or about 10 wt. %, or less of the first separator layer, with the balance being the ceramic particles, and/or any additional components that may be included in the first separator layer.

Binders utilized with the present technology may be characterized by a glass transition temperature above operational temperatures of the battery cell. By utilizing binders having a higher glass transition temperature, separators according to the present technology are characterized by improved thermal and dimensional stability in embodiments, and are less prone to shrinking over cell lifetime or during abuse conditions, or may shrink to a lesser degree than separators including binders characterized by a lower glass transition temperature. In some embodiments, one or more including all binders utilized in the first separator layer may be characterized by a glass transition temperature greater than or about 100° C.

Combinations of materials, amounts of materials, and characteristics of the materials themselves may produce binders characterized by a glass transition temperature of any temperature within any particular range over 100° C., or within smaller ranges, such as between about 190° C. and about 300° C. or less, in some embodiments. By utilizing binders characterized by higher glass transition temperatures, produced first separator layers may be characterized by reduced flexibility or ductility compared to layers produced with other binders. However, the amount and types of binders may be modified, functionalized, or adjusted to limit cracking or other issues related to malleability, while still maintaining the desired thermal and dimensional stability characteristics.

A variety of materials may be used as binders according to the present technology. Binders may include any polymeric materials that may be characterized by any of the previously noted glass transition temperatures, compatibility with the ceramic particles, or chemical or electrochemical stability with electrolyte materials that may be used within battery cells. Exemplary materials that may be used or included with binders of the present technology may include polyimides. The polyimides may be linear or include aromatic moieties, and may include semi-aromatic polyimides. Exemplary polyimides may also be modified to incorporate additional functional moieties including carboxylate moieties, for example. The binder materials may also include polyamides, which may also be aliphatic, semi-aromatic, or otherwise include aromatic moieties. Exemplary materials may include amorphous polymers, such as polyamide imides, for example, or other polymeric materials that are characterized by glass transition temperatures as discussed above, and exhibit other properties suitable for battery cells according to the present technology.

Ceramic materials that may be incorporated with the binders for the first separator layer 210 may include any ceramic that may afford additional dimensional stability to the separator design. The ceramic materials may include oxides, nitrides, carbides, hydroxides, and titanates of a number of materials. Exemplary elements for these compounds may be or include barium, strontium, boron, iron, lead, zirconium, magnesium, silicon, aluminum, titanium, yttrium, or zinc. For example, exemplary ceramic materials may include aluminum nitride, aluminum oxide, including alpha and gamma classes, boron nitride, including hexagonal crystalline form, magnesium hydroxide, silicon nitride, silicon aluminum oxynitride or Sialon, as well as any other ceramic materials or combination.

By producing separators according to embodiments of the present technology, reduced thickness separators may be produced compared to conventional ceramic separators. For example, while conventional standalone ceramic separators may be limited to thicknesses greater than or about 20 µm, the present technology may produce separators, including one or both of separator layers 210 and 260, that are less than or about 30 µm in thickness, and may be characterized by a thickness of less than or about 25 µm, less than or about 20 µm, less than or about 18 µm, less than or about 16 µm, less than or about 15 µm, less than or about 14 µm, less than or about 13 µm, less than or about 12 µm, less than or about 11 µm, less than or about 10 µm, less than or about 9 µm, less than or about 8 µm, less than or about 7 µm, less than or about 6 µm, less than or about 5 µm, less than or about 4 µm, or less in embodiments. Additionally, by forming the separator layers directly over electrode materials or current collectors as described further below, separators according to embodiments of the present technology may be wound into rolls of materials that may be later processed into particular cell form factors and configurations. When ceramic separators are formed over a liner, such as with conventional devices, the thickness is often limited to a minimum above a few dozen micrometers to allow adequate handling of the produced separator. Once the liner is removed, the separator is then placed in a cell. The present technology is not limited in this respect, because the ceramic layer is formed directly over the electrode active material, which may also provide the benefit of allowing the composite product to be wound during fabrication.

Exemplary first separator layer 210 may also include one or more additional components, such as porogen 240 or microencapsulated material 250. Porogen 240 may be included within the layer to allow additional porosity to be produced during fabrication. For example, porogen 240 may include a low-molecular-weight polymer or monomer that may evaporate when exposed to an energy source, such as ultraviolet light, an e-beam, or a heat source. By adjusting the wavelength or intensity of the energy source, more or less porogen may be dissolved, which may adjust the porosity and tortuosity through the separator layer. Accordingly, porosity and air permeability may be maintained to facilitate ionic transportation through exemplary battery cell separators of the present technology. In some embodiments, a porogen may not be incorporated. For example, depending on the ceramic material utilized, such as gamma alumina as one non-limiting example, the porosity through the separator layer may be sufficient, and additional porosity through porogen dissolution may not be performed, although in some embodiments incorporation of porogen or a lesser inclusion may be performed.

Exemplary separators according to the present technology may be characterized by a porosity greater than or about 15%, and may be characterized by a porosity greater than or about 20%, greater than or about 30%, greater than or about 40%, greater than or about 50%, greater than or about 60%, greater than or about 70%, greater than or about 80%, or more, although porosity may be maintained below or about 85%, below or about 80%, below or about 75%, below or about 70%, below or about 65%, or below or about 60%, to provide adequate control over transfer across the separator. Porosity may also be maintained within any range encompassed by any of these ranges or between any two noted or encompassed percentages.

As noted previously, air permeability may be related to porosity and pore tortuosity across a thickness of the separator, which may affect ionic transfer across the separator during operation in a battery cell. Air permeability may be measured as the time in seconds to pass 100 cubic centimeters of air across the separator. Separators according to the present technology may be characterized by air permeability across the separator of less than or about 400 s/100 cc. In some embodiments, the separator may be characterized by air permeability of less than or about 350 s/100 cc, less than or about 300 s/100 cc, less than or about 250 s/100 cc, less than or about 200 s/100 cc, less than or about 150 s/100 cc, less than or about 100 s/100 cc, less than or about 50 s/100 cc, or less. Any of the air permeability numbers may relate to any number of separator components or layers as well as any thickness of the separator or individual layers.

First separator layer 210 also includes a microencapsulated material 250 in some embodiments. Dispersed throughout the first separator layer 210, microencapsulated material 250 may provide an additional feature to cause shutdown of ionic transfer during abuse events. Because ceramic materials may be characterized by high thermal stability, the separator may maintain functionality during these events. Microencapsulated material 250 may operate to fill pores of the first separator layer 210, which may reduce, limit, or halt ionic transfer across the separator. For example, microencapsulated material 250 may include a first material 252 contained within a second material 254. The second material 254 may form a shell about the first material 252, which may be a flowable material. The second material 254 may be characterized by a breakdown temperature, which may be a melting temperature in some embodiments, although the breakdown temperature may also be a temperature at which the first material 252 may be expressed from the second material 254.

The breakdown temperature may be based on a cell operation temperature in some embodiments. For example, for cell designs configured to operate at temperatures below 100° C., the breakdown temperature may be greater than 100° C. The breakdown temperature may also be a relative temperature to the cell operating temperature, such as a temperature at least about 10° C. above the cell operating temperature, at least about 20° C. above the cell operating temperature, at least about 30° C. above the cell operating temperature, at least about 40° C. above the cell operating temperature, at least about 50° C. above the cell operating temperature, or higher. Once the first material 252 is released from the second material 254, the first material may flow within the first separator layer 210, to fill pores within the structure, and block ionic movement across the separator.

Second separator layer 260, may be included along the first separator layer 210 opposite the electrode material 205. Binders utilized in separators according to the present technology may provide reduced adhesion to electrode active materials utilized in the cell. During cell cycling, as the active materials may swell, interfacial issues may extend without adequate adhesion between the separator and the electrode. This may allow further swelling, which may affect capacity or other capabilities of the battery cell. By incorporating an additional adhesive material, which may be second separator layer 260 or included within the layer, the present technology may overcome issues related to binders characterized by improved thermal stability.

Exemplary adhesives may include a variety of adhesive materials that may couple or bond with both the first separator layer 210 of the separator as well as an adjacent electrode active material. Suitable adhesives may include multiple adhesive materials including polymeric materials. Exemplary polymeric materials include materials including acetate, acrylate, vinyl groups, styrene, or any other materials that may be utilized according to the present technology. For example, exemplary adhesives may include acrylate and polyvinylidene fluoride ("PVDF"), the morphology of which may be controlled to limit reductions in porosity. For example, the adhesives may be provided in ovular or spherical shaped segments, which allow additional spacing between adhesive particles. In some embodiments the second separator layer 260 may also be applied discontinuously across the surface of the first separator layer 250.

Exemplary adhesive particles may be characterized by a diameter of less than or about one micrometer in embodiments, and may be characterized by a diameter of less than or about 900 nm, less than or about 800 nm, less than or about 700 nm, less than or about 600 nm, less than or about 500 nm, less than or about 400 nm, less than or about 300 nm, less than or about 200 nm, less than or about 100 nm, or less. Additionally, the adhesive may be applied so as to further limit the effect on porosity or air permeability. For example, the second separator layer 260 may be staggered, or patch coated, along a surface of the first separator layer 210. In non-limiting embodiments, the second separator layer may be particles, lines, or other shapes of adhesive particles formed across the surface of the first separator layer.

When an additional adhesive is applied along a surface of the separator, the adhesive may block or otherwise affect the pores through the separator. This may affect air permeability, which may be related to rate capability of a battery cell in which the separator may be disposed. By utilizing any of a number of forms of discontinuous coating, the adhesive may be incorporated to reduce an impact on porosity and permeability, while providing sufficient adhesion to an electrode active material. Additionally, when the adhesive particles include a rounded, ovular, or spherical shape, gaps may be maintained about particles included in the adhesive layer. This may allow separators according to embodiments of the present technology to maintain any of the porosity or air permeability characteristics described previously.

Figure 3:
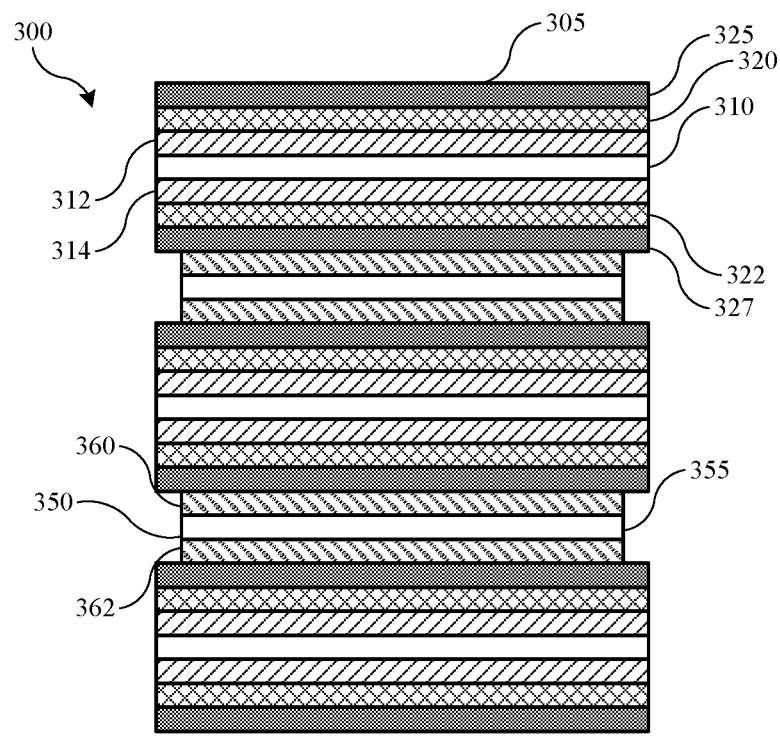
FIG. 3 shows a schematic cross-sectional view of a stacked battery according to some embodiments of the present technology.

FIG. 3 illustrates a schematic cross-sectional view of a stacked battery 300 according to some embodiments of the present technology. Stacked battery 300 may include multiple electrodes including anode electrodes 305 and cathode electrodes 350 according to embodiments of the present technology, and may include one or more of the components or materials discussed previously. As illustrated, separators may be formed along the anode active materials, although this is not intended to be limiting. For example, in many battery cell designs in which a graphite material is utilized within the anode, the anode may be characterized by a larger size than the corresponding lithium-containing cathode material in order to match the operating functionality of the electrodes. Accordingly, because the anode may be larger than the cathode in some embodiments, the separator may be formed along the anode to provide complete coverage between the active materials of the two electrodes. It is to be understood that in other embodiments the separator layers may be formed over the cathode active material.

As illustrated, anode electrodes 305 may include an anode current collector 310, which may be copper or any of the previously noted materials. On opposing surfaces, an anode active material 312, 314 may be formed. It is to be understood that other cell designs are similarly encompassed by the present technology, such as wound battery cells, in which the active material, as well as the separator materials, may be formed on both current collector surfaces or on only one surface of the current collector. A first separator layer 320, 322 may be formed across each of the respective anode active material layers 312, 314 as will be described below. A second separator layer 325, 327 may be formed over each of the respective first separator layers 320, 322.

Cathode electrodes 350 may include a cathode current collector 355, which may be aluminum or any other material that may operate as a cathode current collector. On opposing surfaces of the cathode current collector 355 may be cathode active material 360, 362. The anode electrodes 305 and the cathode electrodes 350 may then be stacked in alternating layers as illustrated to produce a stacked battery 300. The second separator layers 325, 327 may couple the anode electrodes 305 with the cathode electrodes 350. In this way, the first separator layers 320, 322 may be positioned adjacent or in contact with the anode active materials, 312, 314, while the second separator layers 325, 327 may be positioned adjacent or in contact with the cathode active materials 360, 362. When the separators are formed on the cathode electrodes, it is to be understood that the individual separator layers may be in contact with the alternate active materials.

Figure 4:
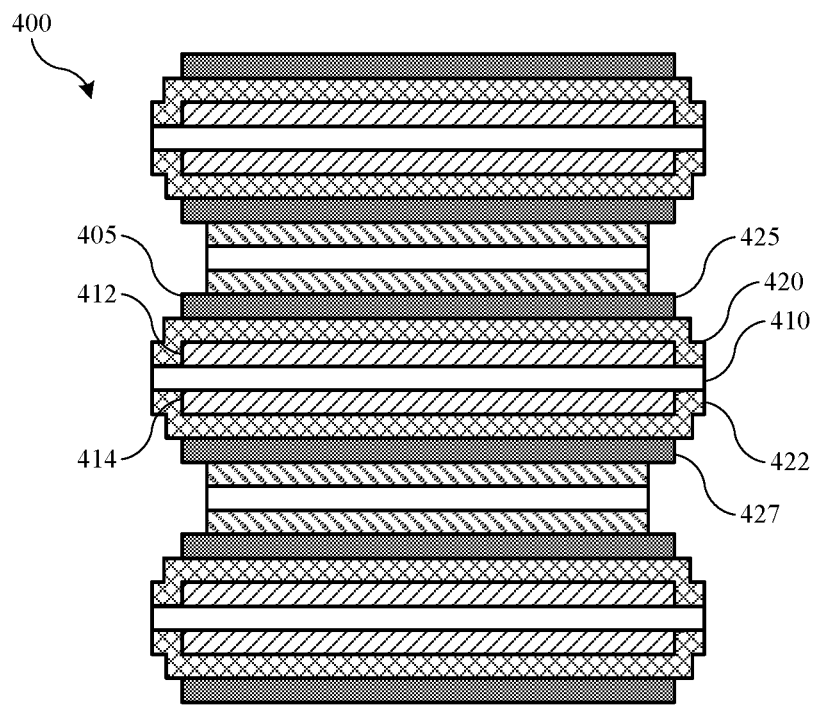
FIG. 4 shows a schematic cross-sectional view of a stacked battery according to some embodiments of the present technology.

FIG. 4 shows a schematic cross-sectional view of a stacked battery 400 according to some embodiments of the present technology. Stacked battery 400 may include a battery similar to stacked battery 300, and may include similar materials as noted above. Stacked battery 400 may illustrate an alternative arrangement of separator materials, which may extend beyond the lateral dimensions of the electrode active materials, and may at least partially contact one or more of the current collectors. Again, stacked battery 400 illustrates the separators formed over the anode electrodes 405, although it is to be understood that the separators may be formed over the cathode electrodes in other embodiments. As illustrated, first separator layers 420, 422 may extend beyond one or both lateral edges of anode active material 412, 414. The first separator layers 420, 422 may contact current collector 410 on both opposing surfaces of the current collector. Such a configuration may further limit the possibility of contact between the active materials or current collectors that may cause shorting within the battery for either stacked or wound cell designs.

FIG. 4 illustrates only the first separator layers 420, 422 extending beyond the lateral edges of the anode active materials 412, 414 and contacting current collector 410. It is to be understood that in alternative configurations second separator layers 425, 427, or both separator layers, may extend beyond the lateral edges of the anode active materials. However, as noted previously, in some embodiments the second separator layers 425, 427 may not be complete coatings, and may be discontinuous across the surface of the electrode. Accordingly, such a discontinuous coating may not provide the encapsulation of first separator layers 420, 422, which may be complete across the surface of the anode active materials 412, 414.

Figure 5:
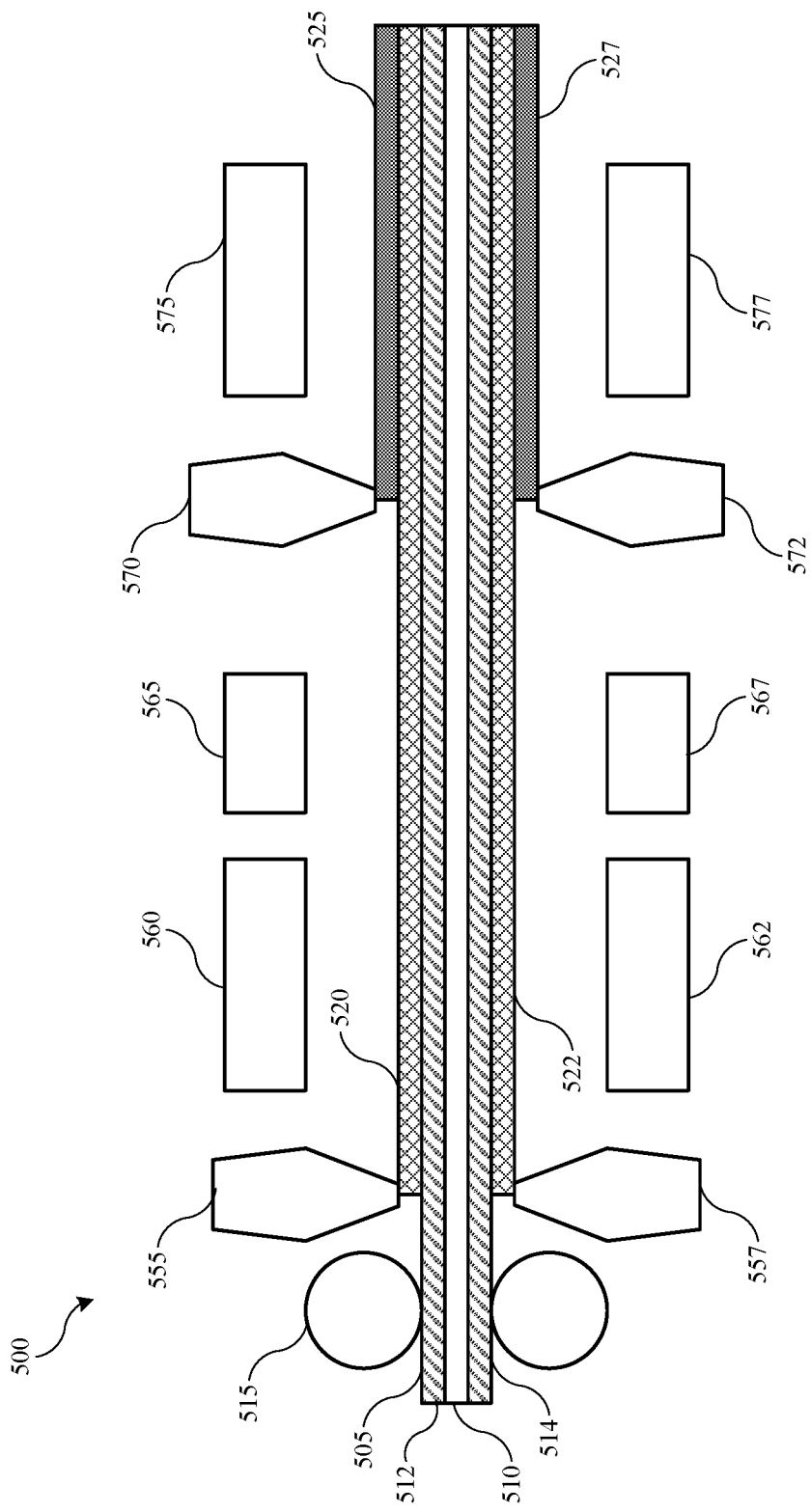
FIG. 5 shows a schematic view of a fabrication process for producing separators according to some embodiments of the present technology.

FIG. 5 shows a schematic view of a fabrication process 500 for producing separators according to some embodiments of the present technology. The fabrication process 500 may be performed as a roll-to-roll process, and may be performed to produce windings of battery cell components that may be further processed in later fabrication operations. Fabrication process 500 may be a mid-line process performed on a substrate of pre-formed materials, such as electrode active materials previously disposed on a current collector. The substrate may be provided directly from a previous operation, such as deposition of electrode active materials on a current collector, or a roll of electrode active material on current collector may be unspooled into fabrication process 500. Similarly, subsequent processing, the substrate on which a separator is formed may be wound into a spool for later processing, or may be delivered to additional equipment to be further processed. In some embodiments, the material formed by fabrication process 500 may be directly used in wound cell applications, or diced for stacked cell configurations.

As noted, fabrication process 500 may deliver a substrate 505 to a set of rollers 515, or some other apparatus for moving the substrate through the fabrication process 500. Substrate 505 may include a current collector 510 on which an electrode active material may be disposed. The electrode active material may be disposed on one or two opposing surfaces of the current collector. As illustrated, electrode active materials 512, 514 are formed over current collector 510, and delivered into the fabrication process. As discussed previously, the electrode active materials 512, 514 may be either anode active materials or cathode active materials in different embodiments. Fabrication process 500 may include depositing a first separator layer 520 over the electrode active material 512, as well as first separator layer 522 on electrode active material 514 when formed on opposite sides of the substrate 505. The first separator layer 520 may be or include any of the materials discussed previously for first separator layers, and in some embodiments first separator layers 520, 522 include a ceramic material. The first separator layers may be applied or deposited in any number of ways including by gravure coating, slot die coating, doctor blade coating, or other coating techniques that may provide a complete and uniform coverage across the electrode active materials 512, 514. Representative applicators 555, 557 are illustrated to represent any of these potential deposition techniques.

Fabrication process 500 may also include depositing a second separator layer 525 over the first separator layer 520, as well as a second separator layer 527 on first separator layer 522 when formed on opposite sides of the substrate 505. Second separator layers 525, 527 may be or include any of the materials discussed previously for the second separator layers, and in some embodiments second separator layers 525, 527 are or include an adhesive material. As previously noted, second separator layers 525, 527 may be continuous coatings or may be discontinuous in some embodiments. The second separator layers may be applied or deposited in any number of ways including by gravure coating, slot die coating, doctor blade coating, spray coating, or other coating techniques that may provide a complete and uniform coverage or discontinuous coverage across the first separator layers 520, 522. Representative applicators 570, 572 are illustrated to represent any of these potential deposition techniques. Subsequent deposition of the second separator layers, the substrate 505 may be passed through or across dryers 575, 577 to dry the second separator layer to form a battery cell component, which may include an electrode and separator structure in some embodiments.

In some embodiments, the porosity of the formed separator may be sufficient for operation, and thus the fabrication process 500 may be a wet-on-wet process. The first separator layers may include one or more solvents that may be maintained while the second separator layers 525, 527 are formed overlying the first separator layers 520, 522. The operation of drying the second separator layers may include drying the first separator layers as well to remove the remaining solvents.

In other embodiments, the first separator layers 520, 522 may include a porogen as previously described, that may be exposed to an energy source to dissolve some of the porogen and increase the porosity of the formed separator layer. When a porogen is included in the first separator layers 520, 522 deposited on the electrode active materials, the fabrication process may include additional operations. As illustrated, first separator layers 520, 522 may be dried under dryers 560, 562 subsequent the deposition, and prior to formation of second separator layers 525, 527. By drying the first separator layers 520, 522, the ceramic materials may be set, and may limit further flowing of the layers subsequent the exposure, which may otherwise close pores formed by dissolving the porogen. The drying process may be controlled by temperature, path length, and time across dryers 560, 562, which may include multiple sets of dryers in some embodiments. However, because first separator layers 520, 522 may be less than 20 µm in thickness in some embodiments, the drying process may be performed with relative ease along the fabrication process.

After the first separator layers 520, 522 have been dried, the layers may be exposed to an energy source to dissolve at least a portion of the porogen contained within the first separator layers. The energy source may be any source that may dissolve some or all of the porogen within the first separator layers without damaging the ceramic material or binder. In some embodiments ultraviolet exposure, e-beam exposure, or heat exposure may be performed to dissolve at least a portion of the porogen to produce the porous structure. Exemplary energy sources 565, 567 may provide the energy to dissolve at least a portion of the porogen in embodiments. Phase inversion is an additional technique by which porosity may be formed within a material layer. However, because the first separator layer is formed directly overlying electrode active materials of the battery cell components, phase inversion may not be applicable to fabrication process 500 in some embodiments.

Figure 6:
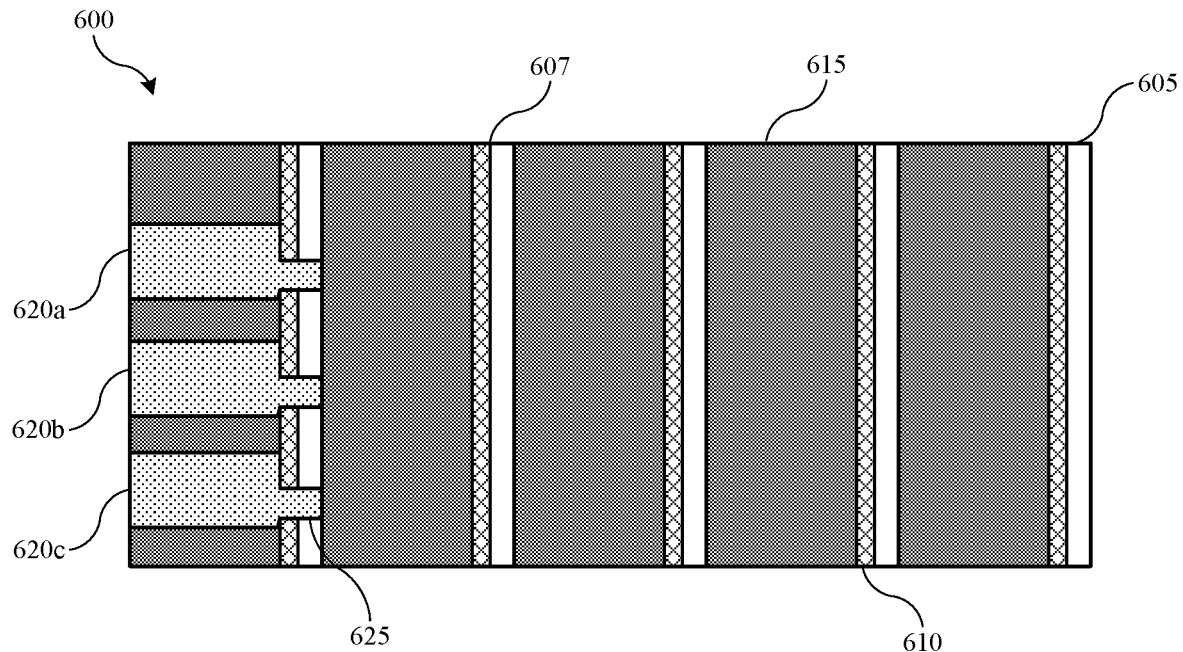
FIG. 6 shows a schematic plan view of a produced battery cell component sheet according to some embodiments of the present technology.

Turning to FIG. 6 is shown a schematic plan view of a produced battery cell component sheet 600 according to some embodiments of the present technology. Sheet 600 may be substrate 505 subsequent performance of fabrication process 500 to form a separator material over electrode active materials. Fabrication process 500 was described as a continuous process being performed along a moving substrate. Sheet 600 illustrates how fabrication process 500 may be performed by discontinuous application of the first separator materials and the second separator materials to allow formation of electrode tab portions of the formed battery components. In embodiments the sheet 600 may be used in stacked cell formation where layers of material may be disposed vertically. This material may be used from materials formed in fabrication process 500 or from additional formation techniques.

In many battery cells, the electrode current collectors include a tab portion allowing for delivery or receipt of current to or from the battery cell during operation. The tab portion of current collectors is often formed or cut from the current collector after deposition of the electrode active materials. This cutting process may produce burrs on the current collector, which may be a metal material. These burrs may puncture separators disposed over the current collector and active material, which may cause shorting between layers of a formed battery cell. The present technology may reduce the formation or effect of cut burrs by forming the separator layer over the current collector prior to dicing of the electrodes.

As illustrated in FIG. 6, a current collector 605 may be provided during a fabrication operation. Although hidden under illustrated separator layers, electrode active materials may be applied discontinuously along the current collector 605 in some embodiments of the present technology. The electrode active materials may be applied to maintain lateral gaps 607 across the current collector, and along the substrate between electrode segments. The current collector 605 may remain exposed within lateral gaps 607. A first separator material 610 and a second separator material 615 may then be formed overlying the electrode active materials by any of the techniques previously described. Similar to the electrode active material, the first separator material 610 and the second separator material 615 may be discontinuously applied over the substrate. At least one of the first separator material and the second separator material, such as first separator material 610 as illustrated, may be deposited to extend partially within the lateral gaps 607 laterally across the current collector 605. The application may not fully extend across the lateral gaps 607, which may maintain a portion of the underlying current collector 605 exposed within the lateral gaps 607. This portion of the exposed current collector 605, may form the electrode tab.

Subsequent formation of the layers of electrode and separator materials, a dicing operation may be performed to divide the substrate into a number of battery cell components, such as electrodes including separator materials. The dicing may be performed to produce a number of electrode shaped components 620a, 620b, 620c as illustrated. The battery cell electrodes as diced may include an electrode tab 625 that includes a section of the current collector 605 exposed within the lateral gaps 607 across the current collector substrate. The tab 625 is also partially coated with at least one of the first separator layer 610 or the second separator layer 615. Although three such battery components 620a, 620b, 620c are illustrated, it is to be understood that any number of components may be formed depending on the lateral dimensions of the substrate, the size of the components being diced, and the amount of waste material produced, which may be based on the efficiency and precision of the dicing.

Figure 7:
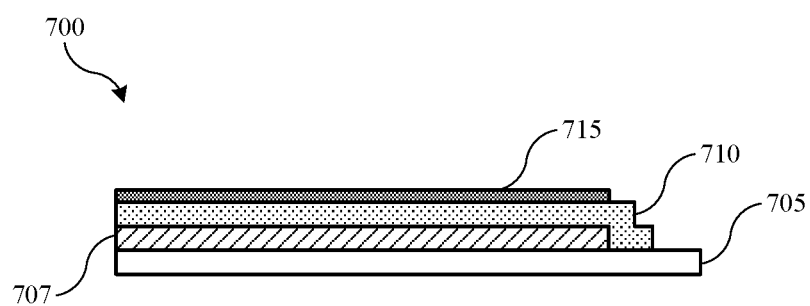
FIG. 7 shows a schematic cross-sectional view of a produced battery cell component according to some embodiments of the present technology.

FIG. 7 shows a schematic cross-sectional view of a produced battery cell component 700 according to some embodiments of the present technology. Subsequent the dicing discussed above, an individual component 700 may be formed that includes a first separator material 710 and a second separator material 715 formed over a current collector 705. As illustrated, first separator material may extend into the tab portion of the current collector 705, and may extend over an electrode active material 707. Accordingly, when the dicing is performed, the portion of the first separator layer 710 extending onto the current collector 705 may protect against burrs which may otherwise be formed. Because the first separator layer 710 may be present prior to dicing, any burrs produced may be contained within the first separator layer, which may encapsulate the burr at the time it is formed.

Forming the separator materials over the electrode active materials and current collectors may provide additional advantages over conventional designs. For example, in battery designs having shapes that are not rectangular, such as L-shaped or T-shaped cells, for example, conventional formation may produce adhesion issues with the separator materials. For example, in many conventional fabrication techniques, the current collector is cut, followed by application of the separator, which is subsequently cut to size. The process may then include the application of heat or pressure to the materials to allow adhesion between the separator and the electrode active materials to occur. However, this process may cause increased stress at the corners where the cutting was performed compared to central areas, which may cause delamination of the separator along corners or edges. Similarly z-folding processes and bi-cell stacking can produce similar issues of inconsistent stress along the interface of the separator. Direct coating processes such as described overcome these issues by forming and laminating the separator prior to dicing, which may afford improved adhesion and reduced delamination at edge regions.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:
1. A battery cell comprising:
a first current collector;
a cathode active material disposed along the first current collector;
a second current collector;

an anode active material disposed on the second current collector, wherein the anode active material includes a first end coupled to a first portion of the second current collector and a second end coupled to a second portion of the second current collector; and a separator disposed between the cathode active material and the anode active material, wherein the separator comprises:

a first separator layer adjacent the anode active material, wherein:

the first separator layer comprises a ceramic material;

the first separator layer extends laterally beyond the first end of the anode active material to contact the first portion of the second current collector about a periphery of the anode active material; and the second portion of the second current collector is free from contact with the first separator layer; and a second separator layer adjacent the cathode active material, wherein:

the second separator layer comprises an adhesive material discontinuously patterned across the first separator layer; and the second separator layer includes an end terminally aligned with the second end of the anode active material.

2. The battery cell of claim 1, wherein the end of the second separator layer is terminally aligned with the second portion of the second current collector.

3. The battery cell of claim 1, wherein the first current collector and the second current collector are maintained free of contact with the second separator layer.

4. The battery cell of claim 1, wherein the first separator layer is characterized by a thickness less than about 20 µm.

5. The battery cell of claim 1, wherein the ceramic material comprises a compound including an element selected from the group consisting of aluminum, boron, magnesium, silicon, titanium, yttrium, and zirconium.

6. The battery cell of claim 1, wherein the first separator layer comprises a microencapsulated material disposed throughout the first separator layer, wherein the microencapsulated material comprises a first material encapsulated within a second material, and wherein the second material is characterized by a breakdown temperature above about 100° C.

7. The battery cell of claim 6, wherein, when the second material is exposed to the breakdown temperature for a period of time, the first material flows within the first separator layer and fills pores of the first separator layer causing shutdown of the battery cell.

8. The battery cell of claim 1, wherein the first separator layer further comprises a binder.

9. The battery cell of claim 8, wherein the binder comprises a material different from the adhesive material of the second separator layer.

10. The battery cell of claim 8, wherein the anode active material is maintained free of contact with the adhesive material.

11. A battery cell comprising:
a first current collector;
a cathode active material disposed along the first current collector;
a second current collector;
an anode active material disposed on the second current collector, wherein the anode active material includes a first end coupled to a first portion of the second current collector and a second end coupled to a second portion of the second current collector; and a separator disposed between the cathode active material and the anode active material, wherein the separator comprises:

a first separator layer adjacent the anode active material, wherein:

the first separator layer comprises a ceramic material and a binder material;

the first separator layer extends laterally beyond the first end of the anode active material to contact the first portion of the second current collector about a periphery of the anode active material; and the second portion of the second current collector is free from contact with the first separator layer; and a second separator layer adjacent the cathode active material, wherein:

the second separator layer comprises an adhesive material;

the second separator layer includes an end terminally aligned with the second end of the anode active material; and the adhesive material is a different material from the binder material.

12. The battery cell of claim 11, wherein the ceramic material comprises a compound including an element selected from the group consisting of aluminum, boron, magnesium, silicon, titanium, yttrium, and zirconium.

13. The battery cell of claim 11, wherein the first current collector and the second current collector are maintained free of contact with the second separator layer, and wherein the second separator layer is discontinuously coated across the first separator layer.

14. A battery cell comprising:
a first current collector;
a cathode active material disposed along the first current collector;
a second current collector;
an anode active material disposed along the second current collector, wherein the anode active material includes a first end and a second end; and
a separator disposed between the cathode active material and the anode active material, wherein the separator comprises:

a first separator layer adjacent the anode active material, wherein:

the first separator layer comprises a ceramic material;

a first portion and a second portion of the first separator layer respectively extends laterally beyond the first and second ends of the anode active material to contact the second current collector about a periphery of the anode active material; and the first and second portions of the first separator layer includes a non-planar shape; and a second separator layer adjacent the cathode active material, wherein:

the second separator layer comprises an adhesive material;

the second separator layer includes an end terminally aligned with the second end of the anode active material; and the anode active material is maintained free of contact with the adhesive material.

15. The battery cell of claim 14, wherein the first current collector and the second current collector are maintained free of contact with the second separator layer.

16. The battery cell of claim 14, wherein the first separator layer further comprises a binder.

17. The battery cell of claim 14, wherein the ceramic material comprises a compound including an element selected from the group consisting of aluminum, boron, magnesium, silicon, titanium, yttrium, and zirconium.

18. The battery cell of claim 16, wherein the binder comprises a material different from the adhesive material of the second separator layer, and wherein the second separator layer is discontinuously coated across the first separator layer.

19. The battery cell of claim 14, wherein the first separator layer comprises a microencapsulated material disposed throughout the first separator layer, wherein the microencapsulated material comprises a first material encapsulated within a second material, and wherein the second material is characterized by a breakdown temperature above about 100° C.

20. The battery cell of claim 19, wherein, when the second material is exposed to the breakdown temperature for a period of time, the first material flows within the first separator layer and fills pores of the first separator layer causing shutdown of the battery cell.

* * * * *